United States Patent
Omiya et al.

(10) Patent No.: US 9,993,813 B2
(45) Date of Patent: Jun. 12, 2018

(54) HONEYCOMB STRUCTURE

(71) Applicant: NGK INSULATORS, LTD., Nagoya (JP)

(72) Inventors: Yoshimasa Omiya, Nagoya (JP); Takashi Noro, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days. days.

(21) Appl. No.: 15/232,976

(22) Filed: Aug. 10, 2016

(65) Prior Publication Data

US 2016/0346776 A1    Dec. 1, 2016

Related U.S. Application Data (63) Continuation of application No. PCT/JP2015/058170, filed on Mar. 19, 2015.

(30) Foreign Application Priority Data

Mar. 31, 2014 (JP) .................................. 2014-071857

(51) Int. Cl.
*B01J 35/04* (2006.01)
*B01D 53/94* (2006.01)
(Continued)

(52) U.S. Cl.
CPC ............ *B01J 35/04* (2013.01); *B01D 53/885* (2013.01); *B01D 53/94* (2013.01); *B01J 21/18* (2013.01);
(Continued)

(58) Field of Classification Search
CPC .. F01N 3/027; F01N 2240/16; B01D 46/0057
See application file for complete search history.

(56) References Cited

U.S. PATENT DOCUMENTS 4,505,107 A * 3/1985 Yamaguchi ............. F01N 3/027
55/283
5,245,825 A * 9/1993 Ohhashi ............. B01D 53/9454
219/552

(Continued)

FOREIGN PATENT DOCUMENTS

JP    08-131840 A1    5/1996
JP    JP 08-131840 A1    5/1996
(Continued)

OTHER PUBLICATIONS

Japanese Patent No. 4136319 B2 corresponds to U.S. Patent Application Publication No. 2003/0134084 A1, which issued as U.S. Pat. No. 7,011,803.

(Continued)

*Primary Examiner* — Amber R Orlando
(74) *Attorney, Agent, or Firm* — Burr & Brown, PLLC (57) ABSTRACT

A honeycomb structure includes a honeycomb structure body having a porous partition wall which cells and having a circumferential wall at an outer circumference thereof, and also includes a pair of electrodes on a side surface of the honeycomb structure body. An open frontal area of a center part is 0.70 to 0.95 times of that of an outer circumferential part, where the center part is defined as an area from a center of the honeycomb structure body to a position of 10% of a length from the center to the outer circumference in a direction toward the outer circumference in a cross-section orthogonal to the cells' extending direction, and the outer circumferential part is defined as an area from the outer circumference to a position of 10% of a length from the outer circumference to the center in a direction toward the center in the cross-section.

12 Claims, 4 Drawing Sheets

(51) Int. Cl.
    *C04B 38/00*     (2006.01)
    *C04B 35/565*     (2006.01)
    *B01D 53/88*     (2006.01)
    *B01J 21/18*     (2006.01)
    *B01J 35/00*     (2006.01)
    *B01J 35/02*     (2006.01)
    *F01N 3/20*     (2006.01)
    *F01N 3/28*     (2006.01)
    *C04B 41/87*     (2006.01)
    *C04B 41/00*     (2006.01)
    *C04B 41/50*     (2006.01)
    *C04B 111/00*     (2006.01)

(52) U.S. Cl.
CPC ......... *B01J 35/0033* (2013.01); *B01J 35/023* (2013.01); *C04B 35/565* (2013.01); *C04B 38/0006* (2013.01); *C04B 38/0009* (2013.01); *C04B 41/009* (2013.01); *C04B 41/5059* (2013.01); *C04B 41/87* (2013.01); *F01N 3/2026* (2013.01); *F01N 3/2828* (2013.01); *B01D 2255/30* (2013.01); *C04B 2111/0081* (2013.01); *C04B 2235/3826* (2013.01); *C04B 2235/428* (2013.01); *C04B 2235/5436* (2013.01); *F01N 2330/06* (2013.01); *F01N 2330/34* (2013.01); *F01N 2330/48* (2013.01); *F01N 2470/20* (2013.01)

(56) References Cited

U.S. PATENT DOCUMENTS

| | | | | |
|---|---|---|---|---|
| 5,259,190 A * | 11/1993 | Bagley | ............... | B01D 46/0032 422/174 |
| 5,266,278 A * | 11/1993 | Harada | ................. | F01N 3/2026 219/541 |
| RE35,134 E * | 12/1995 | Mizuno | ................. | B01J 35/0033 219/552 |
| 5,651,248 A * | 7/1997 | Kawamura | ........ | B01D 46/0063 55/283 |
| 5,800,787 A * | 9/1998 | Kato | .................... | B01J 35/0033 219/205 |
| 5,852,285 A * | 12/1998 | Kato | .................... | B01J 35/0033 219/528 |
| 5,861,611 A * | 1/1999 | Kato | .................... | B01J 35/0033 219/205 |
| 6,939,522 B1 * | 9/2005 | Harada | ............. | B01D 39/2075 422/211 |
| 7,011,803 B2 | 3/2006 | Ichikawa et al. | | |
| 7,056,365 B2 * | 6/2006 | Ichikawa | ........... | B01D 46/2451 428/116 |
| 7,238,217 B2 * | 7/2007 | Cutler | ................ | B01D 46/2429 55/385.3 |
| 7,384,441 B2 * | 6/2008 | Ito | ..................... | B01D 39/2068 428/116 |
| 8,158,908 B2 * | 4/2012 | Konieczny | ........... | B01D 46/525 219/202 |
| 8,257,460 B2 * | 9/2012 | Komori | ............. | B01D 46/2459 422/177 |
| 8,530,803 B2 * | 9/2013 | Sakashita | ................ | B01J 35/04 219/541 |
| 8,535,405 B2 * | 9/2013 | Noguchi | ............... | C04B 35/565 422/169 |
| 8,597,585 B2 * | 12/2013 | Sakashita | ................ | B01J 35/04 422/174 |
| 8,716,635 B2 * | 5/2014 | Noguchi | .................. | B01J 35/04 219/553 |
| 8,803,043 B2 | 8/2014 | Sakashita et al. | | |
| 8,907,256 B2 * | 12/2014 | Hashimoto | .............. | F01M 5/00 219/553 |
| 9,073,289 B2 * | 7/2015 | Tamai | ....................... | B32B 3/12 |
| 9,188,040 B2 | 11/2015 | Kaneda et al. | | |
| 9,533,294 B2 * | 1/2017 | Hayashi | ................ | B01J 32/00 |
| 9,586,195 B2 * | 3/2017 | Hayashi | ................ | C04B 35/195 |
| 2003/0134084 A1 | 7/2003 | Ichikawa et al. | | |
| 2004/0071932 A1 * | 4/2004 | Ishihara | ............. | B01D 46/2429 428/116 |
| 2004/0101654 A1 * | 5/2004 | Hijikata | ............. | B01D 39/2068 428/116 |
| 2004/0131512 A1 * | 7/2004 | Abe | .................... | B01D 46/0024 422/180 |
| 2004/0258582 A1 * | 12/2004 | Miwa | ..................... | B01D 45/16 422/177 |
| 2005/0042151 A1 * | 2/2005 | Alward | .............. | B01D 39/2082 422/177 |
| 2012/0076698 A1 * | 3/2012 | Ishihara | ................ | B01D 53/00 422/174 |
| 2012/0076699 A1 * | 3/2012 | Ishihara | ............... | B01J 19/2485 422/174 |
| 2012/0317942 A1 * | 12/2012 | Komori | .............. | B01D 46/2455 55/483 |
| 2013/0043236 A1 * | 2/2013 | Sakashita | .............. | F01N 3/2828 219/553 |
| 2014/0212339 A1 | 7/2014 | Kaneda et al. | | |
| 2015/0030510 A1 * | 1/2015 | Mase | ....................... | B01J 35/04 422/180 |

FOREIGN PATENT DOCUMENTS

| | | | | |
|---|---|---|---|---|
| JP | 4136319 B2 | 8/2008 | | |
| WO | 2011/125815 A1 | 10/2011 | | |
| WO | 2013/047790 A1 | 4/2013 | | |
| WO | WO-2013111793 A1 * | 8/2013 | ........... | C04B 35/195 |
| WO | 2013/146955 A1 | 10/2013 | | |

OTHER PUBLICATIONS

International Publication No. WO 2011/125815 A1 corresponds to U.S. Patent Application Publication No. 2013/0043236 A1, which issued as U.S. Pat. No. 8,803,043 B2.
International Publication No. WO 2013/047790 A1 corresponds to U.S. Patent Application Publication No. 2014/0212339 A1, which issued as U.S. Pat. No. 9,188,040 B2.
International Publication No. WO 2013/146955 A1 corresponds to U.S. Patent Application Publication No. 2015/0030510 A1.
International Search Report and Written Opinion (Application No. PCT/JP2015/058170) dated Jun. 23, 2015.

* cited by examiner

HONEYCOMB STRUCTURE

BACKGROUND OF THE INVENTION

1. Field of the Invention

The present invention relates to a honeycomb structure. More specifically, the present invention relates to a honeycomb structure that is a catalyst carrier and also serves as a heater when a voltage is applied thereto, and that is able to raise a temperature thereof to a necessary temperature up to a center part thereof in a short time when a voltage is applied thereto to purify an exhaust gas.

2. Description of Related Art

Hitherto, a cordierite honeycomb structure having a catalyst loaded thereon has been used for the treatment of a harmful substance in an exhaust gas emitted from an automobile engine. Further, there is known a technology of using a honeycomb structure formed of a silicon carbide sintered body to purify an exhaust gas (for example, see Patent Document 1).

When the exhaust gas is treated by the catalyst loaded on the honeycomb structure, there is a need to raise the temperature of the catalyst to a predetermined temperature. However, since the catalyst temperature is low when an engine is started, there is a problem that the exhaust gas is not sufficiently purified.

For that reason, a method of raising the temperature of the exhaust gas by a metallic heater (metallic carrier for an electrically heating type of catalyst device) provided at the upstream side of the honeycomb structure having the catalyst loaded thereon has been examined (for example, see Patent Document 2).

Further, there is proposed usage of a ceramic honeycomb structure as a "heatable catalyst carrier" (for example, see Patent Document 3).

PRIOR ART DOCUMENTS

Patent Documents

[Patent Document 1] Japanese Patent No. 4136319
[Patent Document 2] JP-A-8-131840
[Patent Document 3] WO 2011/125815

SUMMARY OF THE INVENTION

Problem to be Solved by the Invention

When the above-described heater mounted on an automobile is used, a power supply which is used in an electric system of the automobile and supplies, for example, a high voltage of 200 V is commonly used. However, since the metallic heater has low electric resistance, there is a problem that an excessive current flows to the metallic heater to damage a power supply circuit when such a high-voltage power supply is used.

Meanwhile, since the honeycomb structure disclosed in Patent Document 3 is formed of ceramic having a predetermined electric resistivity, heat is uniformly (without a deviation in temperature distribution) generated by energization, without damaging a power supply circuit. The honeycomb structure disclosed in Patent Document 3 is excellent as an electric heating type catalyst carrier. Meanwhile, there is still room for improvement in that the vicinity of the center part, in which the flow rate of the exhaust gas is large, needs to be efficiently heated in order to cause a current to uniformly flow in the entire honeycomb structure. More specifically, since the honeycomb structure disclosed in Patent Document 3 has a configuration in which an electrode is disposed on a side surface of a pillar-shaped honeycomb structure body, and thus the heat generation proceeds from an outer circumferential part to a center part at the time of energization, there is room for improvement in that the time necessary for "raising the temperature of the center part to a temperature necessary for ensuring purifying performance" needs to be shortened.

The present invention is made in view of the above-described circumstances and an object of the present invention is to provide a honeycomb structure that is a catalyst carrier and also serves as a heater when a voltage is applied thereto, and that is able to raise a temperature thereof to a necessary temperature up to a center part thereof in a short time when a voltage is applied thereto to purify an exhaust gas.

Means for Solving the Problem

In order to solve the above-described problems, the present invention provides the following honeycomb structure.

According to a first aspect of the present invention, a honeycomb structure is provided including: a pillar-shaped honeycomb structure body that includes a porous partition wall which defines and forms a plurality of cells formed as fluid flow passages and extending from a first end face as one end face to a second end face as the other end face, and that includes a circumferential wall located at an outer circumference of the honeycomb structure body; and a pair of electrodes which are disposed on a side surface of the honeycomb structure body, wherein an electric resistivity of the honeycomb structure body is 1 to 200 Ωcm, each of the pair of electrodes is formed in a band shape extending in an extending direction of the cells of the honeycomb structure body, in a cross-section orthogonal to the extending direction of the cells, one electrode of the pair of electrodes is disposed at the opposite side to the other electrode of the pair of electrodes with a center of the honeycomb structure body interposed therebetween, and an open frontal area of a center part is 0.70 to 0.95 times an open frontal area of an outer circumferential part, where the center part is defined as an area from a center of the honeycomb structure body to a position of 10% of a length from the center to the outer circumference in a direction toward the outer circumference in a cross-section orthogonal to the extending direction of the cells of the honeycomb structure body, and the outer circumferential part is defined as an area from the outer circumference to a position of 10% of a length from the outer circumference to the center in a direction toward the center in the cross-section.

According to a second aspect of the present invention, the honeycomb structure according to the first aspect is provided, wherein an open frontal area of an intermediate part defined as an area between the center part and the outer circumferential part in the honeycomb structure body, is equal to or larger than the open frontal area of the center part and equal to or smaller than the open frontal area of the outer circumferential part.

According to a third aspect of the present invention, the honeycomb structure according to the first or second aspects is provided, wherein a thickness of the partition wall of the center part is 1.0 to 2.0 times a thickness of the partition wall of the outer circumferential part.

According to a fourth aspect of the present invention, the honeycomb structure according to any one of the first to third aspects is provided, wherein the honeycomb structure body and the electrode are made of a material containing silicon carbide.

According to a fifth aspect of the present invention, the honeycomb structure according to any one of the first to fourth aspects is provided, wherein a cell density of the center part is 1.0 to 1.5 times a cell density of the outer circumferential part.

According to a sixth aspect of the present invention, the honeycomb structure according to any one of the first to fifth aspects is provided, wherein the open frontal area of the center part is 0.75 to 0.90 times the open frontal area of the outer circumferential part.

According to a seventh aspect of the present invention, the honeycomb structure according to the sixth aspect is provided, wherein the open frontal area of the center part is 0.80 to 0.85 times the open frontal area of the outer circumferential part.

Effect of the Invention

In the honeycomb structure of the present invention, the open frontal area of the center part is 0.70 to 0.95 times the open frontal area of the outer circumferential part. For that reason, the electric resistivity of the center part becomes lower than the electric resistivity of the outer circumferential part. Thus, when a voltage is applied to the honeycomb structure, a large current flows to the center part and hence the center part is heated faster than the related art. Accordingly, a temperature can be raised to a necessary temperature up to the center part in a short time when a voltage is applied to the honeycomb structure to purify the exhaust gas. Then, the exhaust gas can be treated effectively at the center part through which more exhaust gas flows compared to the outer circumferential part.

DETAILED DESCRIPTION OF THE INVENTION

Next, a mode for carrying out the present invention will be described in detail with reference to the drawings. It should be understood that the present invention is not limited to embodiments below and various modifications and improvements are made appropriately on the basis of the general knowledge of the person skilled in the art without departing from the spirit of the present invention.

Figure 1:
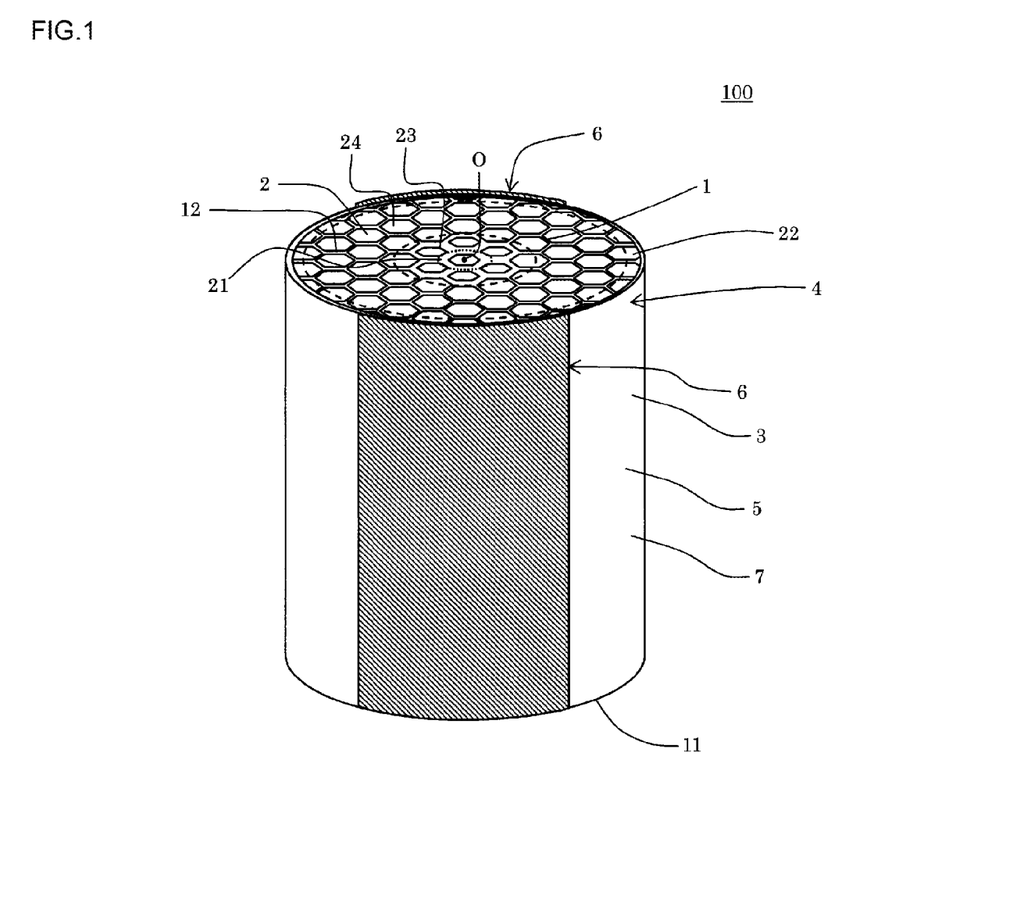
FIG. 1 is a perspective view schematically showing an embodiment of a honeycomb structure of the present invention.
Figure 2:
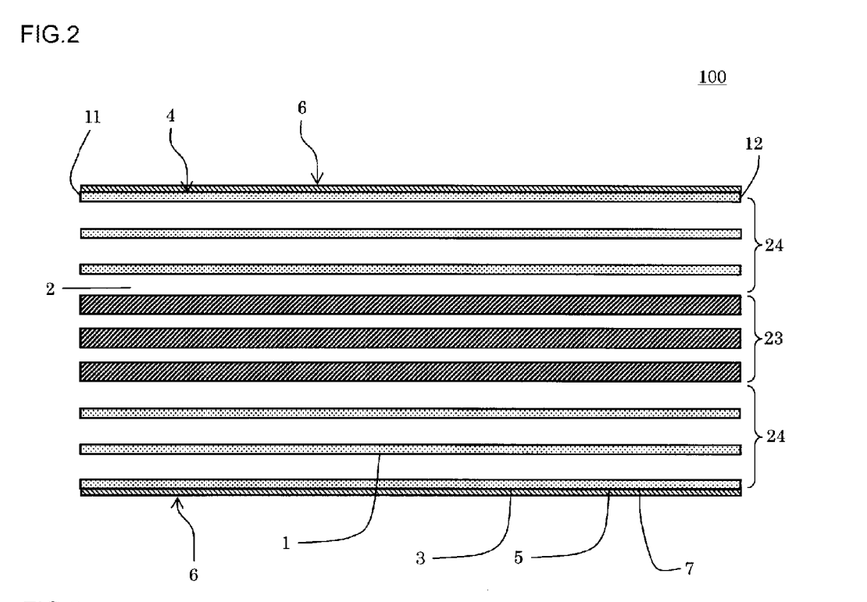
FIG. 2 is a schematic diagram showing a cross-section in which cells of the embodiment of the honeycomb structure of the present invention are parallel in an extending direction.
Figure 3:
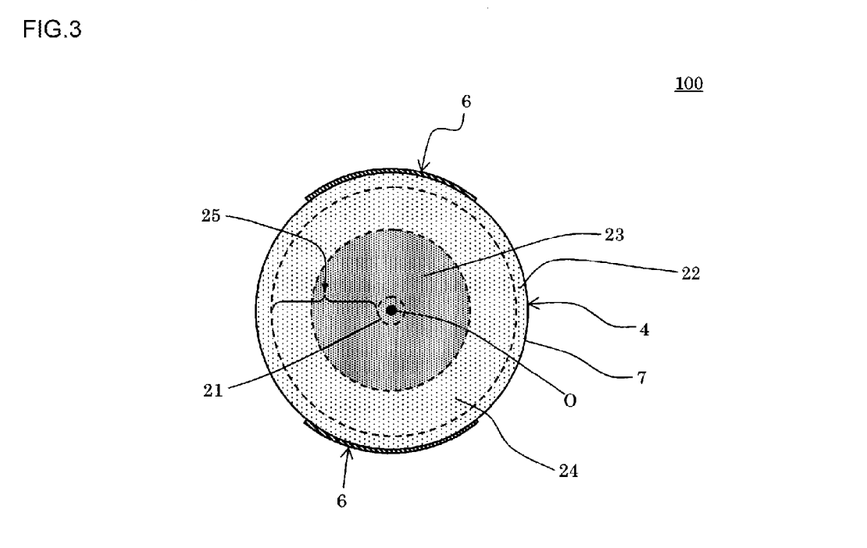
FIG. 3 is a schematic diagram showing a cross-section in which the cells of the embodiment of the honeycomb structure of the present invention are orthogonal to the extending direction.
Figure 4:
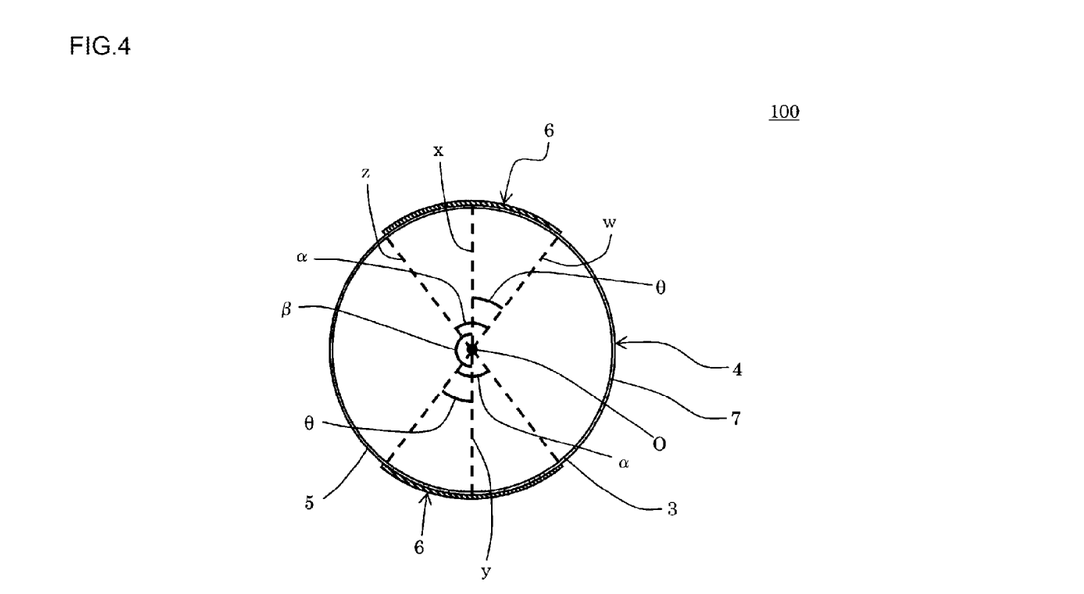
FIG. 4 is a schematic diagram showing a cross-section in which the cells of the embodiment of the honeycomb structure of the present invention are orthogonal to the extending direction.

(1) Honeycomb Structure:

An embodiment of a honeycomb structure of the present invention includes, as shown in FIGS. 1 to 4, a pillar-shaped honeycomb structure body 4 and a pair of electrodes 6 and 6 disposed on a side surface 5 of the honeycomb structure body 4. The honeycomb structure body 4 includes a porous partition wall 1 which defines and forms a plurality of cells 2 formed as fluid flow passages and "extending from a first end face 11 as one end face to a second end face 12 as the other end face" and a circumferential wall 3 which is located in an outer circumference 7. Then, the electric resistivity of the honeycomb structure body 4 is 1 to 200 Ωcm. Then, each of the pair of electrodes 6 and 6 is formed in a band shape extending in the extending direction of the cell 2 of the honeycomb structure body 4. Then, in a cross-section orthogonal to the extending direction of the cell 2, one electrode 6 of the pair of electrodes 6 and 6 is disposed at the opposite side to the other electrode 6 of the pair of electrodes 6 and 6 with a center O of the honeycomb structure body 4 interposed therebetween. Then, in a cross-section orthogonal to the extending direction of the cell 2 of the honeycomb structure body 4, a center part 21 is defined as an area from the center O to the "position of 10% of the length from the center O to the outer circumference 7 in a direction toward the outer circumference 7". In addition, in the cross-section, an outer circumferential part 22 is defined as an area from the outer circumference 7 to "the position of 10% of the length from the outer circumference 7 to the center O in a direction toward the center O". Here, an open frontal area of the center part 21 is 0.70 to 0.95 times an open frontal area of the outer circumferential part 22. Here, the "open frontal area" is a value in which a value obtained by dividing the area of the cell by the sum of the areas of the partition wall and the cell (the cell area sum/(the cell area sum+the partition wall area sum)) is expressed as a percentage in a cross-section orthogonal to the extending direction of the cell 2 of the honeycomb structure body 4. That is, the "open frontal area" of each area can be mentioned as an average value of the "open frontal area" in the corresponding area. FIG. 1 is a perspective view schematically showing an embodiment of the honeycomb structure of the present invention (a honeycomb structure 100). FIG. 2 is a schematic diagram showing a cross-section in which the cells of the embodiment of the honeycomb structure of the present invention are parallel in the extending direction. FIG. 3 is a schematic diagram showing a cross-section in which the cells of the embodiment of the honeycomb structure of the present invention are orthogonal to the extending direction. FIG. 4 is a schematic diagram showing a cross-section in which the cells of the embodiment of the honeycomb structure of the present invention are orthogonal to the extending direction. Further, in FIGS. 3 and 4, the partition wall is omitted.

In this way, a current does not flow excessively to the honeycomb structure 100 of the embodiment even when a current flows from a high-voltage power supply thereto since the electric resistivity of the honeycomb structure body 4 is 1 to 200 Ωcm and hence the honeycomb structure can be appropriately used as a heater. Further, each of the pair of electrodes 6 and 6 of the honeycomb structure 100 of the embodiment is formed in a band shape extending in the extending direction of the cell 2 of the honeycomb structure body 4. Then, in a cross-section orthogonal to the extending direction of the cell 2, one electrode 6 of the pair of electrodes 6 and 6 is disposed at the opposite side to the other electrode 6 of the pair of electrodes 6 and 6 with the center of the honeycomb structure body 4 interposed therebetween. For that reason, a deviation in the temperature distribution of the honeycomb structure body 4 can be suppressed when a voltage is applied across the pair of electrodes 6 and 6. Further, the temperature of the center part 21 may be different from the temperature of the outer circumferential part 22. A "deviation in the temperature distribution of the honeycomb structure body 4" indicates a state where a temperature is locally high or low.

Further, in the honeycomb structure 100 of the embodiment, the open frontal area of the center part 21 is 0.70 to 0.95 times the open frontal area of the outer circumferential part 22. For that reason, the electric resistivity of the center part 21 becomes lower than the electric resistivity of the outer circumferential part 22. Thus, when a voltage is applied to the honeycomb structure 100, more current flows to the center part 21 and hence the center part 21 is heated fast. Accordingly, a temperature can be raised to a necessary temperature up to the center part 21 in a short time when a voltage is applied to the honeycomb structure 100 to purify the exhaust gas. Then, the exhaust gas can be treated effectively at the center part 21 through which more exhaust gas flows compared to the outer circumferential part 22. In addition, the heat quantity required for the temperature of the center part to be raised to a necessary temperature can be decreased.

Here, "one electrode 6 of the pair of electrodes 6 and 6 is disposed at the opposite side to the other electrode 6 of the pair of electrodes 6 and 6 with the center O of the honeycomb structure body 4 interposed therebetween in a cross-section orthogonal to the extending direction of the cell 2" means below. First, in a cross-section orthogonal to the extending direction of the cell 2, a "line connecting the center point of one electrode 6 (a center point in the "circumferential direction of the honeycomb structure body 4") to the center O of the honeycomb structure body 4" is denoted as a first line x. Then, in a cross-section orthogonal to the extending direction of the cell 2, a "line connecting a center point of the other electrode 6 (a center point in the "circumferential direction of the honeycomb structure body 4") to the center O of the honeycomb structure body 4" is denoted as a second line y. Here, it means that the pair of electrodes 6 and 6 are disposed in the honeycomb structure body 4 so as to have a positional relation in which an angle β formed by the first line x and the second line y (an angle having a center as the "center O" (see FIG. 4)) is in the range of 170° to 190°. Further, a "center angle α of the electrode 6" is an angle formed by two lines connecting both end portions of the electrode 6 to the center O of the honeycomb structure body 4 in a cross-section orthogonal to the extending direction of the cells as shown in FIG. 4. Further, the "center angle α of the electrode 6" can be also mentioned as below. First, in a cross-section orthogonal to the extending direction of the cells, a "line connecting one end portion of the electrode 6 to the center O" is denoted as a third line z. Then, in a cross-section orthogonal to the extending direction of the cells, a "line connecting the other end portion of the same electrode 6 to the center O" is denoted as a fourth line w. Here, the "center angle α of the electrode 6" is an internal angle of the portion of the center O of the shape (for example, a fan shape) formed by the "electrode 6", the third line z, and the fourth line w in a cross-section orthogonal to the extending direction of the cells.

In the honeycomb structure 100 of the embodiment, the open frontal area of the center part 21 is 0.70 to 0.95 times the open frontal area of the outer circumferential part 22 as described above. Then, the open frontal area of the center part 21 is preferably 0.75 to 0.90 times and more preferably 0.80 to 0.85 times the open frontal area of the outer circumferential part 22. When the open frontal area of the center part 21 is smaller than 0.70 times the open frontal area of the outer circumferential part 22, the pressure loss of the center part 21 becomes large and hence the exhaust gas does not easily flow. When the open frontal area of the center part 21 is larger than 0.95 times the open frontal area of the outer circumferential part 22, a temperature cannot be raised to a necessary temperature up to the center part 21 in a short time when a voltage is applied to the honeycomb structure 100 to purify the exhaust gas. The ratio of the open frontal areas of the center part 21 and the outer circumferential part 22 has been described above. Here, each of the open frontal areas of the center part 21 and the outer circumferential part 22 will be described below. The open frontal area of the center part 21 is preferably 50 to 80%, more preferably 55 to 75%, and particularly preferably 60 to 70%. When the open frontal area is smaller than 50%, pressure loss often becomes large. When the open frontal area is larger than 80%, it is often difficult for the open frontal area of the center part 21 to be smaller than the open frontal area of the outer circumferential part 22. The open frontal area of the outer circumferential part 22 is preferably 55 to 85%, more preferably 60 to 80%, and particularly preferably 65 to 75%. When the open frontal area is smaller than 55%, it is often difficult for the open frontal area of the outer circumferential part 22 to be larger than the open frontal area of the center part 21. When the open frontal area is larger than 85%, the strength of the honeycomb structure 100 is often degraded.

In the honeycomb structure 100 of the embodiment, it is preferable that the thickness of the partition wall of the center part 21 be thicker than the thickness of the partition wall of the outer circumferential part 22 so that the open frontal area of the center part 21 becomes smaller than (0.70 to 0.95 times) the open frontal area of the outer circumferential part 22. Here, the thickness of the partition wall 1 of the center part 21 is preferably 1.0 to 2.0 times, more preferably 1.2 to 1.8 times, and particularly preferably 1.4 to 1.7 times the thickness of the partition wall 1 of the outer circumferential part 22. When the thickness is smaller than 1.0 times the thickness of the partition wall 1 of the outer circumferential part 22, it is often difficult for the temperature rising speed of the center part 21 at the time of application of the voltage to be improved. When the thickness is larger than 2.0 times the thickness of the partition wall 1 of the outer circumferential part 22, the pressure loss of the center part 21 often becomes so large that it is difficult for the exhaust gas to flow.

Further, it is preferable that the cell density of the center part 21 be larger than the cell density of the outer circumferential part 22 so that the open frontal area of the center part 21 becomes smaller than (0.70 to 0.95 times) the open frontal area of the outer circumferential part 22. Here, the cell density of the center part 21 is preferably 1.0 to 1.5 times, more preferably 1.0 to 1.4 times, and particularly preferably 1.05 to 1.3 times the cell density of the outer circumferential part 22. When the cell density of the center part 21 is smaller than 1.0 times the cell density of the outer circumferential part 22, it is often difficult for the temperature rising speed of the center part 21 at the time of application of the voltage to be improved. When the cell density of the center part 21 is larger than 1.5 times the cell density of the outer circumferential part 22, the pressure loss of the center part 21 often becomes so large that it is often difficult for the exhaust gas to flow.

Figure 6:
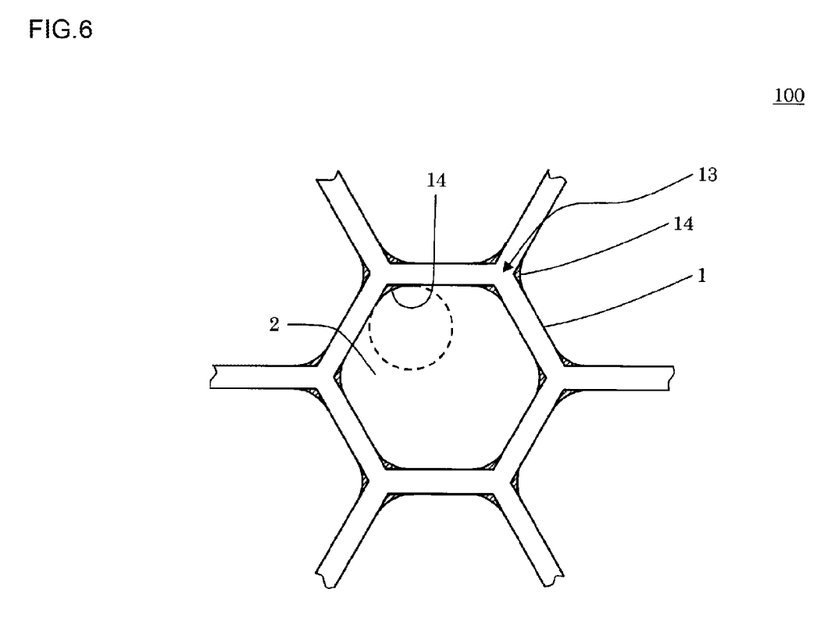
FIG. 6 is a schematic diagram showing a cross-section in which the cells of the embodiment of the honeycomb structure of the present invention are orthogonal to the extending direction.

As shown in FIG. 6, it is preferable to form the honeycomb structure 100 of the embodiment so that a rounded portion 14 is formed in an intersection point portion 13 of the partition wall 1 of the center part in a cross-section orthogonal to the extending direction of the cells. The rounded portion 14 is a portion which is formed thickly so that the surface of the intersection point portion 13 is formed in an "inward recessed circular arc shape". The surface of the partition wall 1 of the intersection point portion 13 of the partition wall 1 is smoothly connected in a circular arc shape by the rounded portion 14. Further, when the intersection point portion 13 of the partition wall 1 includes the rounded portion 14, a corner in the cross-sectional shape of the cell 2 is formed in a circular arc shape instead of an apex. When the rounded portion 14 is formed in the intersection point portion 13 of the partition wall 1 of the center part in this way, the open frontal area of the center part can be decreased. Further, the intersection point portion 13 of the partition wall 1 in both the center part and the outer circumferential part may be formed thickly, and the intersection point portion 13 of the partition wall 1 in the center part may be thicker than the intersection point portion 13 of the partition wall 1 in the outer circumferential part. The radius of the circular-arc of the rounded portion 14 is preferably 0.05 to 0.6 mm. FIG. 6 is a schematic diagram showing a cross-section orthogonal to the extending direction of the cells in the honeycomb structure of the embodiment.

Further, the open frontal area of the center part 21 which is smaller than (0.70 to 0.95 times) the open frontal area of the outer circumferential part 22 is preferably realized by the combination of the above-mentioned requirements for the partition wall thickness, the cell density, and the thickness of the intersection point portion of the partition wall.

It is preferable that the open frontal area of an intermediate part 25 defined as an area between the center part 21 and the outer circumferential part 22 of the honeycomb structure body 4, be equal to or larger than the open frontal area of the center part 21 and equal to or smaller than the open frontal area of the outer circumferential part 22. When the open frontal area of the intermediate part 25 is a value smaller than the open frontal area of the center part 21, much current often flows to the intermediate part 25 so that the temperature rising speed of the center part 21 decreases. When the open frontal area of the intermediate part 25 is a value larger than the open frontal area of the outer circumferential part 22, the thermal shock resistance is often degraded.

In the honeycomb structure 100 of the embodiment, the thickness of the partition wall 1 of the center part 21 is preferably 100 to 310 μm, more preferably 130 to 250 μm, and particularly preferably 150 to 230 μm. When the thickness of the partition wall 1 is in such a range, it is possible to suppress an excessive increase in pressure loss when the exhaust gas flows to the honeycomb structure 100 even when a catalyst is loaded on the honeycomb structure as a catalyst carrier. When the thickness of the partition wall 1 is smaller than 100 μm, the strength of the honeycomb structure is often degraded. When the thickness of the partition wall 1 is thicker than 310 μm, the pressure loss often increases when the exhaust gas flows to the honeycomb structure 100 where the honeycomb structure is used as the catalyst carrier to load a catalyst thereon.

In the honeycomb structure 100 of the embodiment, it is preferable that the entire honeycomb structure body 4 be formed of the same material. When a material forming the honeycomb structure body 4 is different in accordance with the place (portion) of the honeycomb structure body 4, an operation or a process for changing the material is needed. On the contrary, when the entire honeycomb structure body 4 is formed of the same material, the honeycomb structure 100 can be obtained by extruding a molding raw material prepared substantially uniformly to form a honeycomb formed body and firing the honeycomb formed body without changing the material thereof. For that reason, the honeycomb structure 100 is manufactured easily. Even when the entire honeycomb structure body 4 is formed of the same material in this way in the honeycomb structure 100 of the embodiment, the temperature of the center part 21 can be raised fast when a voltage is applied thereto. Further, in the honeycomb structure 100 of the embodiment, it is preferable that the electric resistivity of the material forming the center part 21 be equal to the electric resistivity of the material forming the outer circumferential part 22. Accordingly, an operation or a process of changing the material is not needed when the honeycomb structure 100 is manufactured.

In the honeycomb structure 100 of the embodiment, the cell density of the center part 21 is preferably 60 to 125 cells/cm$^2$, more preferably 75 to 115 cells/cm$^2$, and further preferably 85 to 110 cells/cm$^2$. When the cell density is in such a range, catalyst purifying performance can be improved while the pressure loss generated by the flow of the exhaust gas is small. When the cell density is lower than 60 cells/cm$^2$, a catalyst loading area often decreases. When the cell density is higher than 125 cells/cm$^2$, the pressure loss generated by the flow of the exhaust gas is often large when the honeycomb structure 100 is used as the catalyst carrier to load a catalyst thereon.

In a cross-section orthogonal to the extending direction of the cells of the honeycomb structure 100 of the embodiment, it is preferable that the outer circumferential shape of the honeycomb structure body 4 (the outer circumferential shape of the outer circumferential part 22), the outer circumferential shape of the center part 21, and the inner circumferential shape of the outer circumferential part 22 be similar to one another. For example, as shown in FIGS. 1 to 3, when the outer circumferential shape of the honeycomb structure body 4 is circular, it is preferable that the outer circumferential shape of the center part 21 and the inner circumferential shape of the outer circumferential part 22 be also circular.

Figure 5:
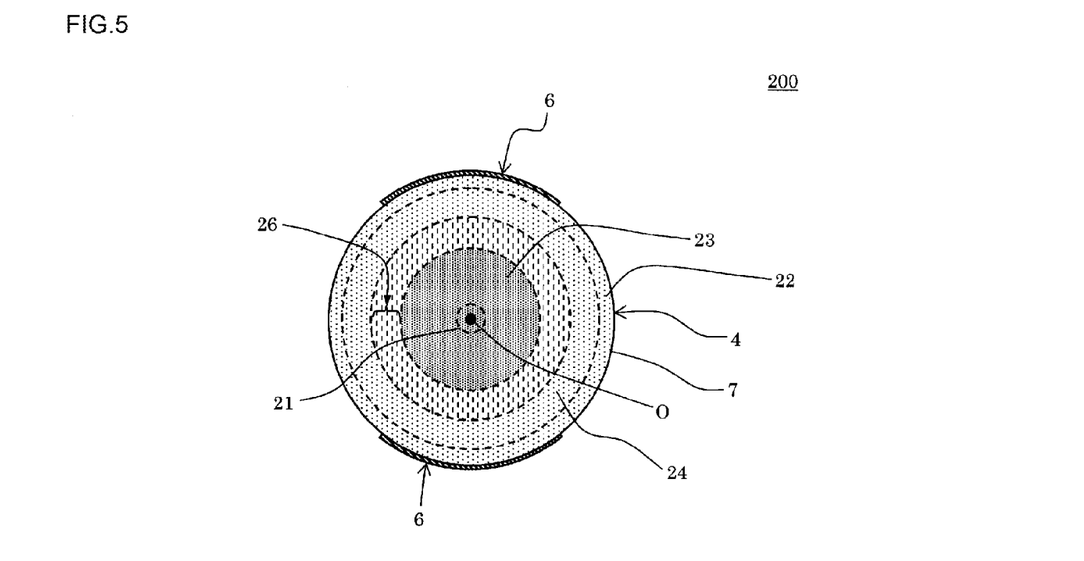
FIG. 5 is a schematic diagram showing a cross-section in which cells of the other embodiment of the honeycomb structure of the present invention are orthogonal to the extending direction.

In a cross-section orthogonal to the extending direction of the cell 2 in the honeycomb structure 100 of the embodiment, a center side area including the center part 21 is denoted as a center side area 23 and an outer circumference side area including the outer circumferential part 22 is denoted as an outer circumference side area 24. Here, it is preferable that the open frontal area of the center side area 23 be equal to the open frontal area of the center part 21 and the open frontal area of the outer circumference side area 24 be equal to the open frontal area of the outer circumferential part 22. In addition, it is a preferable configuration in which the center side area 23 having the "same open frontal area as the open frontal area of the center part 21" and the outer circumference side area 24 having the "same open frontal area as the open frontal area of the outer circumferential part 22" are formed in such a manner that the center side area 23 and the outer circumference side area 24 contact each other as shown in FIGS. 1 to 3. The configuration in which the center side area 23 and the outer circumference side area 24 contact each other means that a cross-section orthogonal to the extending direction of the cells of the honeycomb structure body is divided into two areas of the center side area 23 located at the center side and the outer circumference side area 24 located at the outer circumference side. Further, an intermediate area 26 as a middle area having an intermediate open frontal area between the open frontal area of the center part 21 and the open frontal area of the outer circumferential part 22 may be formed between the center side area 23 having the "same open frontal area as the open frontal area of the center part 21" and the outer circumference side area 24 having the "same open frontal area as the open frontal area of the outer circumferential part 22" (see FIG. 5). Further, in a cross-section orthogonal to the extending direction of the cell 2 of the honeycomb structure 100 of the embodiment, the open frontal area of the intermediate part 25 may be uniform within the intermediate part 25, but may be changed stepwise from a portion contacting the center part 21 toward a portion contacting the outer circumferential part 22. Further, the open frontal area of the center side area 23 may be changed stepwise or continuously. Further, the open frontal area of the outer circumference side area 24 may be also changed stepwise and continuously. In addition, both open frontal areas of the center side area 23 and the outer circumference side area 24 may be changed continuously or stepwise or only one of them may be changed continuously or stepwise. In addition, the open frontal area of the center part 21 may be uniform or changed. When the open frontal area is changed, the open frontal area may be changed stepwise or continuously. Further, the open frontal area of the outer circumferential part 22 may be also uniform or changed. When the open frontal area is changed, the open frontal area may be changed stepwise or continuously. In addition, both the open frontal areas of the center part 21 and the outer circumferential part 22 may be changed continuously or stepwise or only one of them may be changed continuously or stepwise. Further, the open frontal area of the intermediate part 25 may be changed continuously from a portion contacting the center part 21 toward a portion contacting the outer circumferential part 22. FIG. 5 is a schematic diagram showing a cross-section orthogonal to the extending direction of the cells in the other embodiment of the honeycomb structure of the present invention (a honeycomb structure 200). In FIG. 5, the partition wall is not shown in the drawings.

There is a tendency that the thermal stress in the vicinity of the electrode becomes large in the electric heating type honeycomb structure (the honeycomb structure body generating heat by energization) in which the band-shaped electrode is provided in the side surface of the honeycomb structure body. Accordingly, there is still room for improvement in thermal shock resistance. On the contrary, since the open frontal area of the center part 21 of the honeycomb structure 100 of the embodiment is 0.70 to 0.95 times the open frontal area of the outer circumferential part 22 as described above, the Young's modulus of the outer circumferential part 22 becomes low and hence an effect of decreasing the thermal stress in the vicinity of the electrode 6 is obtained. In this way, since the Young's modulus of the outer circumferential part 22 in the honeycomb structure 100 of the embodiment is low and the thermal stress in the vicinity of the electrode 6 decreases, thermal shock resistance is high.

In the honeycomb structure 100 of the embodiment, it is preferable that the honeycomb structure body 4 and the electrode 6 be made of a material containing silicon carbide. As the material containing silicon carbide, a material containing a silicon-silicon carbide composite material or silicon carbide as a main element can be exemplified. Among these, a material containing a silicon-silicon carbide composite material as a main element is more preferable. Then, it is particularly preferable that a material forming the honeycomb structure body 4 and the electrode 6 contains 95 mass % or more of a silicon-silicon carbide composite material. In the present specification, a case in which a "material is a silicon-silicon carbide composite material" means a case in which a "silicon-silicon carbide composite material" is contained by 95 mass % or more. Here, the "main element" means an element contained by 90 mass % or more with respect to the entire element. The silicon-silicon carbide composite material is a material in which silicon carbide particles are bound by metallic silicon. It is preferable that the silicon-silicon carbide composite material be porous due to "silicon carbide particles bound by metallic silicon so that air holes are formed between the silicon carbide particles". When such a material is used, the electric resistivity of the honeycomb structure body 4 can be 1 to 200 Ωcm. The electric resistivity of the honeycomb structure body 4 is a value at 400° C. Further, when the honeycomb structure body 4 and the electrode 6 contain silicon carbide particles and silicon as main elements, the element of the electrode 6 is similar or substantially similar to the element of the honeycomb structure body 4 and hence the thermal expansion coefficients of the electrode 6 and the honeycomb structure body 4 are equal or substantially equal to each other. Further, since the materials are same or substantially same, the bonding strength between the electrode 6 and the honeycomb structure body 4 also becomes high. For that reason, even when a thermal stress is applied to the honeycomb structure 100, it is possible to prevent the electrode 6 from being peeled off the honeycomb structure body 4 or to prevent the bonded portion between the electrode 6 and the honeycomb structure body 4 from being broken.

When the honeycomb structure body 4 is formed of a silicon-silicon carbide composite material, the content of metallic silicon in the silicon-silicon carbide composite material is preferably 10 to 50 mass % and more preferably 20 to 40 mass %. When the content is smaller than 10 mass %, the electric resistivity of the honeycomb structure body 4 is often too high. When the content is larger than 50 mass %, the electric resistivity of the honeycomb structure body 4 is often too low.

In the honeycomb structure 100 of the embodiment, as shown in FIGS. 1 to 4, the pair of electrodes 6 and 6 are disposed on the side surface 5 of the honeycomb structure body 4. The honeycomb structure 100 of the embodiment generates heat when a voltage is applied across the pair of electrodes 6 and 6. The application voltage is preferably 12 to 900 V and more preferably 64 to 600 V.

When a material forming the honeycomb structure body 4 in the honeycomb structure 100 of the embodiment is a "silicon-silicon carbide composite material", it is preferable that the average particle diameter of silicon carbide particles (aggregate) forming the honeycomb structure body 4 be 3 to 50 μm. Then, it is more preferable that the average particle diameter of silicon carbide particles (aggregate) forming the honeycomb structure body 4 be 3 to 40 μm. When the average particle diameter of silicon carbide particles forming the honeycomb structure body 4 is in such a range, the electric resistivity of the honeycomb structure body 4 at 400° C. can be 1 to 200 Ωcm. When the average particle diameter of silicon carbide particles is smaller than 3 μm, the electric resistivity of the honeycomb structure body 4 often becomes large. When the average particle diameter of silicon carbide particles is larger than 50 µm, the electric resistivity of the honeycomb structure body 4 often becomes small. In addition, when the average particle diameter of silicon carbide particles is larger than 50 µm, an extruding die is blocked by a molding raw material when the honeycomb formed body is extruded. The average particle diameter of silicon carbide particles is a value measured by a laser diffraction method.

The porosity of the partition wall 1 of the honeycomb structure body 4 is preferably 35 to 60% and more preferably 35 to 45%. When the porosity is smaller than 35%, deformation during firing often becomes large. When the porosity exceeds 60%, the strength of the honeycomb structure is often degraded. The porosity is a value measured by a mercury porosimeter.

It is preferable that the average pore diameter of the partition wall 1 of the honeycomb structure body 4 be preferably 2 to 15 µm and more preferably 4 to 8 µm. When the average pore diameter is smaller than 2 µm, an electric resistivity often becomes large too much. When the average pore diameter is larger than 15 µm, the electric resistivity often becomes small too much. The average pore diameter is a value measured by a mercury porosimeter.

The shape of the honeycomb structure 100 of the embodiment (the shape of the honeycomb structure body 4) is not particularly limited, but can be formed in a shape, for example, a pillar shape (columnar shape) in which a bottom face is circular, a pillar shape in which a bottom face is oval, or a pillar shape in which a bottom face is polygonal (a square, a pentagon, a hexagon, a heptagon, an octagon, or the like). Further, as the size of the honeycomb structure 100 (the honeycomb structure body 4), the bottom face area is preferably 2000 to 20000 mm² and more preferably 4000 to 10000 mm². Further, the center axis length of the honeycomb structure 100 (the honeycomb structure body 4) is preferably 50 to 200 mm and more preferably 75 to 150 mm. Further, the diameter of the end face of the honeycomb structure body 4 is preferably 3 times or less, more preferably 0.5 to 2.5 times, and particularly preferably 0.8 to 2.0 times the length in the extending direction of the cell 2 of the honeycomb structure body 4. When the diameter of the end face of the honeycomb structure body 4 exceeds 3 times the length in the extending direction of the cell 2 of the honeycomb structure body 4, the honeycomb volume becomes small and hence a catalyst of an amount capable of exhibiting sufficient exhaust gas purifying performance cannot be loaded.

Further, it is preferable that the thickness of the circumferential wall 3 forming the outer circumference of the honeycomb structure body 4 of the honeycomb structure 100 of the embodiment be 0.1 to 2 mm. When the thickness is smaller than 0.1 mm, the strength of the honeycomb structure 100 is often degraded. When the thickness is larger than 2 mm, the area of the partition wall loading a catalyst often becomes small.

In a cross-section orthogonal to the extending direction of the cell 2 of the honeycomb structure 100 of the embodiment, it is preferable that the shape of the cell 2 be a square, a hexagon, an octagon, or a combination of theses. Since the cell shape is formed in this way, the pressure loss generated by the flow of the exhaust gas in the honeycomb structure 100 becomes small and hence the catalyst purifying performance is excellent.

As shown in FIGS. 1 to 4, in the honeycomb structure 100 of the embodiment, each of the pair of electrodes 6 and 6 is formed in a "band shape" extending in the extending direction of the cell 2 of the honeycomb structure body 4. Then, in a cross-section orthogonal to the extending direction of the cell 2, one electrode 6 of the pair of electrodes 6 and 6 is disposed at the opposite side to the other electrode 6 of the pair of electrodes 6 and 6 with the center O of the honeycomb structure body 4 interposed therebetween. In this way, in the honeycomb structure 100 of the embodiment, the electrode 6 is formed in a band shape, the longitudinal direction of the electrode 6 is the extending direction of the cell 2 of the honeycomb structure body 4, and the pair of electrodes 6 and 6 are disposed at the opposite sides with the center O of the honeycomb structure body 4 interposed therebetween. For that reason, when a voltage is applied across the pair of electrodes 6 and 6, a deviation in the current flowing to each of the center part 21 and the outer circumferential part 22 can be suppressed and hence a deviation in the heating degree of each of the center part 21 and the outer circumferential part 22 can be suppressed.

In addition, in a cross-section orthogonal to the extending direction of the cell 2, 0.5 times of the center angle α of each of the electrodes 6 and 6 (the angle θ that is 0.5 times the center angle α) is preferably 15 to 65°. In addition, in a cross-section orthogonal to the extending direction of the cell 2, the upper-limit value of the "angle θ that is 0.5 times the center angle α" of the electrodes 6 and 6 is preferably 60° and more preferably 55°. Further, in a cross-section orthogonal to the extending direction of the cell 2, the lower-limit value of the "angle θ that is 0.5 times the center angle α" of the electrodes 6 and 6 is preferably 20° and more preferably 30°. Further, the "angle θ that is 0.5 times the center angle α" of one electrode 6 is preferably 0.8 to 1.2 times and more preferably 1.0 times the "angle θ that is 0.5 times the center angle α" of the other electrode 6. Accordingly, when a voltage is applied across the pair of electrodes 6 and 6, a deviation in current flowing to each of the center part 21 and the outer circumferential part 22 can be suppressed and hence a deviation in heating degree of each of the center part 21 and the outer circumferential part 22 can be suppressed.

In the honeycomb structure 100 of the embodiment, it is preferable that the electric resistivity of the electrode 6 be lower than the electric resistivity of the center part 21 of the honeycomb structure body 4. In addition, the electric resistivity of the electrode 6 is more preferably 20% or less and particularly preferably 1 to 10% of the electric resistivity of the center part 21 of the honeycomb structure body 4. When the electric resistivity of the electrode 6 is 20% or less of the electric resistivity of the center part 21 of the honeycomb structure body 4, the electrode 6 more effectively serves as an electrode.

The thickness of the electrode 6 is preferably 0.01 to 5 mm and more preferably 0.01 to 3 mm. With such a range, heat can be uniformly generated from each of the center part 21 and the outer circumferential part 22. When the thickness of the electrode 6 is smaller than 0.01 mm, electric resistance becomes high and hence heat cannot be generated uniformly. When the thickness is larger than 5 mm, a breakage occurs during canning.

As shown in FIGS. 1 and 2, in the honeycomb structure 100 of the embodiment, each of the pair of electrodes 6 and 6 extends in the extending direction of the cell 2 of the honeycomb structure body 4 and is formed in a band shape "between both end portions (between both end faces 11 and 12)". In this way, in the honeycomb structure 100 of the embodiment, the pair of electrodes 6 and 6 is disposed across both end portions of the honeycomb structure body 4. Accordingly, when a voltage is applied across the pair of electrodes 6 and 6, a deviation in current flowing to each of the center part 21 and the outer circumferential part 22 can be more effectively suppressed. Here, a case in which the "electrode 6 is disposed across both end portions of the honeycomb structure body 4" means below. That is, one end portion of the electrode 6 contacts one end portion (one end face) of the honeycomb structure body 4 and the other end portion of the electrode 6 contacts the other end portion (the other end face) of the honeycomb structure body 4.

Meanwhile, a state in which at least one end portion of the electrode 6 in the "extending direction of the cell 2 of the honeycomb structure body 4" does not contact the end portion (end face) of the honeycomb structure body 4 is also preferable. Accordingly, the thermal shock resistance of the honeycomb structure can be improved.

In the honeycomb structure 100 of the embodiment, for example, as shown in FIGS. 1 to 4, the electrode 6 is formed in a shape in which a planar rectangular member is curved along the columnar outer circumference. Here, a shape in which the curved electrode 6 is deformed in a non-curved planar member will be referred to as the "planar shape" of the electrode 6. The "planar shape" of the electrode 6 shown in FIGS. 1 to 4 becomes rectangular. Then, the case of the "outer circumferential shape of the electrode" indicates the "outer circumferential shape in the planar shape of the electrode".

In the honeycomb structure 100 of the embodiment, the outer circumferential shape of the band-shaped electrode 6 may be a shape in which a rectangular corner portion is formed in a curved line shape. With such a shape, the thermal shock resistance of the honeycomb structure 100 can be improved. Further, the outer circumferential shape of the band-shaped electrode 6 may be also formed in a shape in which the rectangular corner portion is chamfered in a linear shape. With such a shape, the thermal shock resistance of the honeycomb structure 100 can be improved.

The electric resistivity of the electrode 6 is preferably 0.1 to 100 Ωcm and more preferably 0.1 to 50 Ωcm. When the electric resistivity of the electrode 6 is in such a range, the pair of electrodes 6 and 6 effectively serve as electrodes in a pipe through which a high-temperature exhaust gas flows. When the electric resistivity of the electrode 6 is smaller than 0.1 Ωcm, the temperature of the honeycomb structure body 4 in the vicinity of both end portions of the electrode 6 often increases easily in a cross-section orthogonal to the extending direction of the cells. When the electric resistivity of the electrode 6 is larger than 100 Ωcm, a current does not flow easily thereto and hence the electrode is often unable to play a role of an electrode. The electric resistivity of the electrode 6 is a value at 400° C.

The porosity of the electrode 6 is preferably 30 to 60% and more preferably 30 to 55%. When the porosity of the electrode 6 is in such a range, an appropriate electric resistivity can be obtained. When the porosity of the electrode 6 is lower than 30%, deformation often occurs during manufacturing. When the porosity of the electrode 6 is higher than 60%, the electric resistivity is often too high. The porosity is a value measured by a mercury porosimeter.

The average pore diameter of the electrode 6 is preferably 5 to 45 µm and more preferably 7 to 40 µm. When the average pore diameter of the electrode 6 is in such a range, an appropriate electric resistivity can be obtained. When the average pore diameter of the electrode 6 is smaller than 5 µm, the electric resistivity is often too high. When the average pore diameter of the electrode 6 is larger than 45 µm, the strength of the electrode 6 is often weakened so that the electrode is easily broken. The average pore diameter is a value measured by a mercury porosimeter.

When the main element of the electrode 6 is a "silicon-silicon carbide composite material", the average particle diameter of silicon carbide particles contained in the electrode 6 is preferably 10 to 60 µm and more preferably 20 to 60 µm. When the average particle diameter of silicon carbide particles contained in the electrode 6 is in such a range, the electric resistivity of the electrode 6 can be controlled in the range of 0.1 to 100 Ωcm. When the average pore diameter of silicon carbide particles contained in the electrode 6 is smaller than 10 µm, the electric resistivity of the electrode 6 is often large too much. When the average pore diameter of silicon carbide particles contained in the electrode 6 is larger than 60 µm, the strength of the electrode 6 is weakened so that the electrode is often broken easily. The average particle diameter of silicon carbide particles contained in the electrode 6 is a value measured by a laser diffraction method.

When the main element of the electrode 6 is a "silicon-silicon carbide composite material", it is preferable that the ratio of the mass of silicon contained in the electrode 6 with respect to the "sum of the mass of each of silicon carbide particle and silicon" contained in the electrode 6 be 20 to 40 mass %. Then, it is more preferable that the ratio of the mass of silicon with respect to the "sum of the mass of each of silicon carbide particle and silicon" contained in the electrode 6 be 25 to 35 mass %. When the ratio of the mass of silicon with respect to the "sum of the mass of each of silicon carbide particle and silicon" contained in the electrode 6 is in such a range, the electric resistivity of the electrode 6 can be in the range of 0.1 to 100 Ωcm. When the ratio of the mass of silicon with respect to the "sum of the mass of each of silicon carbide particle and silicon" contained in the electrode 6 is smaller than 20 mass %, the electric resistivity is often too large. Meanwhile, when the ratio is larger than 40 mass %, deformation often occurs during manufacturing.

The isostatic strength of the honeycomb structure 100 of the embodiment is preferably 1 MPa or more and more preferably 3 MPa or more. It is preferable that the value of the isostatic strength become larger, but about 6 MPa becomes an upper limit in consideration of the material, the structure and the like of the honeycomb structure 100. When the isostatic strength is smaller than 1 MPa, there is often a concern of breakage when the honeycomb structure 100 is used as a catalyst carrier or the like. The isostatic strength is a value measured by applying a hydrostatic pressure under water.

(2) Honeycomb Structure Manufacturing Method:

A method of manufacturing the honeycomb structure of the present invention is not particularly limited. The honeycomb structure of the present invention can be manufactured by adjusting the structure of a die used in, for example, extruding according to a known method.

EXAMPLES

Hereinafter, the present invention will be described in more detail by examples, but the present invention is not limited to these examples.

Example 1

Silicon carbide (SiC) powder and metallic silicon (Si) powder were mixed at the mass ratio of 80:20 to thereby prepare a ceramic raw material. Then, hydroxypropylmethyl cellulose as a binder, water absorbable resin as a pore former, and water were added to the ceramic raw material to obtain a molding raw material. Then, the molding raw material was kneaded by a vacuum pugmill to form round pillar-shaped kneaded material. The content of the binder was 7 parts by mass when the sum of the silicon carbide (SiC) powder and the metallic silicon (Si) powder was set as 100 parts by mass. The content of the pore former was 3 parts by mass when the sum of the silicon carbide (SiC) powder and the metallic silicon (Si) powder was set as 100 parts by mass. The content of the water was 42 parts by mass when the sum of the silicon carbide (SiC) powder and the metallic silicon (Si) powder was set as 100 parts by mass. The average particle diameter of the silicon carbide powder was 20 μm and the average particle diameter of the metallic silicon powder was 6 μm. Further, the average particle diameter of the pore former was 20 μm. The average particle diameters of the silicon carbide, the metallic silicon, and the pore former were values measured by a laser diffraction method.

The obtained round pillar-shaped kneaded material was extruded by an extruder to thereby obtain a honeycomb formed body having a shape similar to that of the honeycomb structure body 4 forming the honeycomb structure 100 shown in FIG. 1. The obtained honeycomb formed body was formed in a shape including a portion with a "partition wall being formed thickly" and corresponding to the center side area 23 and a portion with a "partition wall being formed relatively thinly to the center side area 23" and corresponding to the outer circumference side area 24. The shape of the honeycomb formed body was adjusted by the shape of the die.

The obtained honeycomb formed body was dried by induction heating, was dried by a hot air dryer for 2 hours at 120° C., and was cut by a predetermined amount at both end faces to thereby manufacture a honeycomb dried body.

Subsequently, the honeycomb dried body was degreased (calcinated), fired, and oxidized to thereby obtain a honeycomb fired body. The degreasing condition was set to 3 hours at 550° C. The firing condition was set to 2 hours at 1450° C. in an argon atmosphere. The oxidizing condition was set to 1 hour at 1300° C.

Next, silicon carbide (SiC) powder and metallic silicon (Si) powder were mixed at the mass ratio of 60:40, and hydroxypropylmethyl cellulose as a binder, glycerin as a moisturizer, surfactant as a dispersing agent, and water were added to the mixed powder and mixed. The mixture was kneaded to thereby form an electrode forming raw material. The content of the binder was 0.5 part by mass when the sum of the silicon carbide (SiC) powder and the metallic silicon (Si) powder was set as 100 parts by mass, the content of the glycerin was 10 parts by mass when the sum of the silicon carbide (SiC) powder and the metallic silicon (Si) powder was set as 100 parts by mass, the content of the surfactant was 0.3 part by mass when the sum of the silicon carbide (SiC) powder and the metallic silicon (Si) powder was set as 100 parts by mass, and the content of the water was 42 parts by mass when the sum of the silicon carbide (SiC) powder and the metallic silicon (Si) powder was set as 100 parts by mass. The average particle diameter of the silicon carbide powder was 52 μm and the average particle diameter of the metallic silicon powder was 6 μm. The average particle diameters of the silicon carbide and the metallic silicon were values measured by a laser diffraction method. The kneading was performed by a vertical agitator.

Next, the electrode forming raw material was applied on the side surface of the honeycomb fired body in a band shape throughout both end faces of the honeycomb fired body so that a thickness of the applied electrode forming raw material was 0.15 mm and "0.5 times the center angle of the applied electrode forming raw material in a cross-section orthogonal to the extending direction of the cells was 50°". The electrode forming raw material was applied to two positions in the side surface of the honeycomb fired body. Then, one of two positions where the electrode forming raw material was applied in a cross-section orthogonal to the extending direction of the cells was disposed at the opposite side with the center of the honeycomb fired body interposed therebetween.

Next, the electrode forming raw material applied to the honeycomb fired body was dried to thereby obtain an unfired electrode attached honeycomb fired body. The drying temperature was set to 70° C.

Subsequently, the unfired electrode attached honeycomb fired body was degreased (calcinated), fired, and oxidized to thereby obtain a honeycomb structure. The degreasing condition was set to 3 hours at 550° C. in an oxidization atmosphere. The firing condition was set to 2 hours at 1450° C. in an argon atmosphere. The oxidizing condition was set to 1 hour at 1300° C. in an oxidization atmosphere.

The average pore diameter (air hole diameter) of the partition wall of the obtained honeycomb structure was 8.6 μm and the porosity thereof was 45%. The average pore diameter and the porosity are values measured by a mercury porosimeter. Further, the diameter of the circular honeycomb structure was 93 mm and the length of the honeycomb structure in the extending direction of the cells was 75 mm. Further, the isostatic strength of the obtained honeycomb structure was 2.5 MPa. The isostatic strength is a breakage strength measured at a hydrostatic pressure in water. In addition, 0.5 times the center angle for each of the two electrodes of the honeycomb structure in a cross-section orthogonal to the extending direction of the cells was 50°. Further, all the thicknesses of two electrodes were 1.5 mm.

Further, the open frontal area of the center part was 0.95 times the open frontal area of the outer circumferential part. Further, the honeycomb structure has a structure in which the center side area contacts the outer circumference side area in a cross-section orthogonal to the extending direction of the cells as in the honeycomb structure 100 shown in FIG. 1. Further, the thickness of the partition wall of the center side area of the honeycomb structure was 152 μm and the thickness of the partition wall of the outer circumference side area thereof was 127 μm. Further, the cell density of the center side area of the honeycomb structure was 93.0 cells/cm² and the cell density of the outer circumference side area thereof was 93.0 cells/cm². Further, the cell shape was hexagonal in a cross-section orthogonal to the extending direction of the cells. The cell pitch was 1.11 mm. The cell pitch is a distance between the center parts in the thickness (partition wall thickness) direction of adjacent parallel partition walls (the partition walls forming two opposite side edges of the hexagon). Further, the center part of the partition wall in the thickness direction is the center position of the partition wall in the thickness direction. Further, the electric resistivity of the electrode was 1.3 Ωcm. The intersection point portion of the partition wall of the center part was provided with a rounded portion and the radius of the circular arc of the rounded portion was 0.3 mm. Further, the intersection point portion of the partition wall of the outer circumferential part was also provided with a rounded portion and the radius of the circular arc of the rounded portion was 0.3 mm. Further, the open frontal area of the center part was 71.8% and the open frontal area of the outer circumferential part was 75.8%.

With regard to the obtained honeycomb structure, the "energization performance" and the "thermal shock resistance" were measured according to the following methods. The result is shown in Table 1.

In Table 1, the "rib thickness (μm)" indicates the thickness (μm) of the partition wall. Further, the "cell density (cells/cm$^2$)" indicates the number of the cells per unit area (cm$^2$) in a cross-section orthogonal to the extending direction of the cells. Further, the "intersection point R (mm)" indicates the radius of the circular arc of the rounded portion. Further, the "open frontal area" indicates a value expressed as a percentage of a value which is obtained by dividing the area of the cell by the sum of the areas of the partition wall and the cell (the cell area sum/(the cell area sum+the partition wall area sum)) in a cross-section orthogonal to the extending direction of the cells. Further, the open frontal area ratio indicates a value of the ratio of the open frontal area of the center part with respect to the open frontal area of the outer circumferential part (the open frontal area of the center part/the open frontal area of the outer circumferential part).

(Energization Performance)

An energization test was performed on the honeycomb structure at the electric power of 5 kW. Then, the temperature at the center of the honeycomb structure body was measured. An energization time was measured until the center temperature of the honeycomb structure body reached 300° C. and a required heat quantity (kJ) was compared. The heat quantity was calculated by the equation of "heat quantity=input electric power (kW)×energization time (sec)".

(Thermal Shock Resistance Test (Burner Test))

The heating and cooling test for the honeycomb structure was performed by a "propane gas burner testing machine including a metallic casing receiving a honeycomb structure and a propane gas burner capable of supplying a heating gas into the metallic casing". The heating gas was a combustion gas for burning a propane gas by the gas burner (propane gas burner). Then, the thermal shock resistance was evaluated by checking whether a crack was generated in the honeycomb structure by the heating and cooling test. Specifically, the obtained honeycomb structure was received (canned) in the metallic casing of the propane gas burner testing machine. Then, a gas (combustion gas) heated by the propane gas burner was supplied into the metallic casing so that the gas passed through the honeycomb structure. The temperature condition (inlet gas temperature condition) of the heating gas flowing into the metallic casing was set as below. First, the temperature was raised to 900° C. in 5 minutes, was kept at 900° C. for 10 minutes, was dropped to 100° C. in 5 minutes, and was kept at 100° C. for 10 minutes. A series of the temperature raising, cooling, and keeping operations will be referred to as a "temperature raising and dropping operation". Subsequently, it was checked whether a crack was generated in the honeycomb structure. When a crack was not found, it was determined that the product passed the thermal shock resistance test. Meanwhile, when a crack was found, it was determined that the product did not pass the thermal shock resistance test.

TABLE 1

| | | Honeycomb Structure | | | | | | | | |
|---|---|---|---|---|---|---|---|---|---|---|
| | | Center part | | | | Outer circumferential part | | | | |
| | Material of Honeycomb Structure Body | Rib Thickness (μm) | Cell Density (cells/cm$^2$) | Intersection Point R (mm) | Open Frontal Area (%) | Rib Thickness (μm) | Cell Density (cells/cm$^2$) | Intersection Point R (mm) | Open Frontal Area (%) | Open Frontal Area Ratio |
| Comparative Example 1 | Si—SiC | 127 | 93.0 | 0.3 | 75.8 | 127 | 93.0 | 0.3 | 75.8 | 1.00 |
| Example 1 | Si—SiC | 152 | 93.0 | 0.3 | 71.8 | 127 | 93.0 | 0.3 | 75.8 | 0.95 |
| Example 2 | Si—SiC | 203 | 93.0 | 0.3 | 64.2 | 127 | 93.0 | 0.3 | 75.8 | 0.85 |
| Example 3 | Si—SiC | 203 | 93.0 | 0.3 | 64.2 | 102 | 93.0 | 0.3 | 79.9 | 0.80 |
| Example 4 | Si—SiC | 203 | 93.0 | 0.3 | 64.2 | 152 | 93.0 | 0.3 | 71.8 | 0.89 |
| Example 5 | Si—SiC | 229 | 93.0 | 0.3 | 60.5 | 127 | 93.0 | 0.3 | 75.8 | 0.80 |
| Example 6 | Si—SiC | 254 | 93.0 | 0.3 | 56.9 | 127 | 93.0 | 0.3 | 75.8 | 0.75 |
| Comparative Example 2 | Si—SiC | 330 | 93.0 | 0.3 | 46.8 | 127 | 93.0 | 0.3 | 75.8 | 0.62 |
| Example 7 | Si—SiC | 152 | 93.0 | 0.5 | 67.0 | 152 | 93.0 | 0.3 | 71.8 | 0.93 |
| Example 8 | Si—SiC | 152 | 93.0 | 0.6 | 63.7 | 152 | 93.0 | 0 | 74.5 | 0.86 |
| Example 9 | Si—SiC | 152 | 104.0 | 0.3 | 70.1 | 152 | 80.0 | 0.3 | 73.9 | 0.95 |
| Example 10 | Si—SiC | 152 | 130.0 | 0.3 | 66.5 | 152 | 80.0 | 0.3 | 73.9 | 0.90 |
| Example 11 | Si—SiC | 203 | 93.0 | 0.3 | 64.2 | 127 | 93.0 | 0.3 | 75.8 | 0.85 |
| Example 12 | Re—SiC | 203 | 93.0 | 0.3 | 64.2 | 127 | 93.0 | 0.3 | 75.8 | 0.85 |

| | Honeycomb Structure Intermediate part | | | | | Energization Performance | | |
|---|---|---|---|---|---|---|---|---|
| | Rib Thickness (μm) | Cell Density (cells/cm$^2$) | Intersection Point R (mm) | Open Frontal Area (%) | Input Electric Power (kW) | Time (second) until reaching 300° C. of Center Temperature | Required Heat Quantity (kJ) for reaching 300° C. of Center Temperature | Thermal Shock Resistance Heating and Cooling Test Result |
| Comparative Example 1 | — | — | — | — | 5 | 40 | 200 | Fail |
| Example 1 | — | — | — | — | 5 | 37 | 185 | Pass |
| Example 2 | — | — | — | — | 5 | 34 | 170 | Pass |
| Example 3 | — | — | — | — | 5 | 33 | 165 | Pass |
| Example 4 | — | — | — | — | 5 | 36 | 180 | Pass |

TABLE 1-continued

| | | | | | | | | |
|---|---|---|---|---|---|---|---|---|
| Example 5 | — | — | — | — | 5 | 33 | 165 | Pass |
| Example 6 | — | — | — | — | 5 | 37 | 185 | Pass |
| Comparative Example 2 | — | — | — | — | 5 | 43 | 215 | Fail |
| Example 7 | — | — | — | — | 5 | 37 | 185 | Pass |
| Example 8 | — | — | — | — | 5 | 35 | 175 | Pass |
| Example 9 | — | — | — | — | 5 | 36 | 180 | Pass |
| Example 10 | — | — | — | — | 5 | 37 | 185 | Pass |
| Example 11 | 178 | 93.0 | 0.3 | 67.9 | 5 | 34 | 170 | Pass |
| Example 12 | — | — | — | — | 5 | 35 | 175 | Pass |

Examples 2 to 12 and Comparative Examples 1 and 2

A honeycomb structure was manufactured similarly to Example 1 except that the conditions were changed as shown in Table 1. In Table 1, "Re-SiC" means "recrystallization SiC" and is obtained by the recrystallization of silicon carbide. Similarly to the case of Example 1, the "energization performance" and the "thermal shock resistance" of the honeycomb structure were measured. The result is shown in Table 1.

From Table 1, in the honeycomb structures of Examples 1 to 12, it is understood that the temperature of the center part rises fast and the necessary heat quantity is small because the open frontal area of the center part is 0.70 to 0.95 times the open frontal area of the outer circumferential part. Further, in the honeycomb structures of Examples 1 to 12, it is understood that the thermal shock resistance is excellent because the open frontal area of the center part is 0.70 to 0.95 times the open frontal area of the outer circumferential part. Further, in the honeycomb structure of Example 10, it is acknowledged that the pressure loss increases when an exhaust gas passes through the honeycomb structure loading a catalyst thereon compared with the honeycomb structure of Example 9 because the cell density of the center part is high.

INDUSTRIAL APPLICABILITY

The honeycomb structure of the present invention can be appropriately used as an exhaust gas purifying catalyst carrier that purifies an exhaust gas of an automobile.

DESCRIPTION OF REFERENCE NUMERALS

1: partition wall, 2: cell, 3: circumferential wall, 4: honeycomb structure body, 5: side surface, 6: electrode, 7: outer circumference, 11: first end face, 12: second end face, 13: intersection point portion, 14: rounded portion, 21: center part, 22: outer circumferential part, 23: center side area, 24: outer circumference side area, 25: intermediate part, 26: intermediate area, 100, 200: honeycomb structure, O: center, α: center angle, β: angle, θ: angle of 0.5 times center angle, x: first line, y: second line, z: third line, w: fourth line

The invention claimed is:

1. A honeycomb structure comprising:
a pillar-shaped honeycomb structure body that includes a porous partition wall which defines and forms a plurality of cells formed as fluid flow passages and extending from a first end face as one end face to a second end face as the other end face, and that includes a circumferential wall located at an outer circumference of the honeycomb structure body; and
a pair of electrodes which are disposed on a side surface of the honeycomb structure body, wherein
an electric resistivity of the honeycomb structure body is 1 to 200 Ωcm,
each of the pair of electrodes is formed in a band shape extending in an extending direction of the cells of the honeycomb structure body,
in a cross-section orthogonal to the extending direction of the cells, one electrode of the pair of electrodes is disposed at the opposite side to the other electrode of the pair of electrodes with a center of the honeycomb structure body interposed therebetween, and
an open frontal area of a center part is 0.70 to 0.95 times an open frontal area of an outer circumferential part, where the center part is defined as an area from a center of the honeycomb structure body to a position of 10% of a length from the center to the outer circumference in a direction toward the outer circumference in a cross-section orthogonal to the extending direction of the cells of the honeycomb structure body, and the outer circumferential part is defined as an area from the outer circumference to a position of 10% of a length from the outer circumference to the center in a direction toward the center in the cross-section.

2. The honeycomb structure according to claim 1, wherein an open frontal area of an intermediate part defined as an area between the center part and the outer circumferential part in the honeycomb structure body, is equal to or larger than the open frontal area of the center part and equal to or smaller than the open frontal area of the outer circumferential part.

3. The honeycomb structure according to claim 1, wherein a thickness of the partition wall of the center part is 1.0 to 2.0 times a thickness of the partition wall of the outer circumferential part.

4. The honeycomb structure according to claim 2, wherein a thickness of the partition wall of the center part is 1.0 to 2.0 times a thickness of the partition wall of the outer circumferential part.

5. The honeycomb structure according to claim 1, wherein the honeycomb structure body and the electrode are made of a material containing silicon carbide.

6. The honeycomb structure according to claim 4, wherein the honeycomb structure body and the electrode are made of a material containing silicon carbide.

7. The honeycomb structure according to claim 1, wherein a cell density of the center part is 1.0 to 1.5 times a cell density of the outer circumferential part.

8. The honeycomb structure according to claim 6, wherein a cell density of the center part is 1.0 to 1.5 times a cell density of the outer circumferential part.

9. The honeycomb structure according to claim 1, wherein the open frontal area of the center part is 0.75 to 0.90 times the open frontal area of the outer circumferential part.

10. The honeycomb structure according to claim 8, wherein the open frontal area of the center part is 0.75 to 0.90 times the open frontal area of the outer circumferential part.

11. The honeycomb structure according to claim 9, wherein the open frontal area of the center part is 0.80 to 0.85 times the open frontal area of the outer circumferential part.

12. The honeycomb structure according to claim 10, wherein the open frontal area of the center part is 0.80 to 0.85 times the open frontal area of the outer circumferential part.

\* \* \* \* \*